US007022763B2

(12) United States Patent
Matsugi et al.

(10) Patent No.: US 7,022,763 B2
(45) Date of Patent: Apr. 4, 2006

(54) BRANCHED OLEFIN COPOLYMER, PROCESS FOR PRODUCING THE SAME, AND USE THEREOF

(75) Inventors: Tomoaki Matsugi, Sodegaura (JP); Nobuo Kawahara, Sodegaura (JP); Hideyuki Kaneko, Sodegaura (JP); Shingo Matsuo, Sodegaura (JP); Shin-ichi Kojoh, Sodegaura (JP); Norio Kashiwa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/681,181

(22) Filed: Oct. 9, 2003

(65) Prior Publication Data
US 2004/0110903 A1    Jun. 10, 2004

(30) Foreign Application Priority Data
Oct. 11, 2002  (JP)  ............................. 2002-298420

(51) Int. Cl.
C08L 51/08    (2006.01)
C08G 63/91   (2006.01)

(52) U.S. Cl. .......................... 525/63; 525/7.4; 525/64; 525/69; 525/84; 525/87; 525/326.1; 525/418; 525/421

(58) Field of Classification Search ................. 525/7.4, 525/63, 64, 69, 84, 87, 326.1, 418, 421
See application file for complete search history.

(56) References Cited

U.S. PATENT DOCUMENTS

| 5,286,800 | A |   | 2/1994  | Chung et al. |
|-----------|---|---|---------|--------------|
| 5,401,805 | A |   | 3/1995  | Chung et al. |
| 5,543,458 | A |   | 8/1996  | Hoxmeier et al. |
| 6,127,481 | A | * | 10/2000 | Janssen et al. ............... 525/106 |
| 6,753,378 | B1| * | 6/2004  | Kojoh et al. ................. 525/7.4 |
| 2001/0047069 | A1 |  | 11/2001 | Chung et al. |

FOREIGN PATENT DOCUMENTS

| EP | 1 186 619 A2 | 3/2002 |
| JP | 02-051511 A | 2/1990 |
| JP | 03-177403 A | 8/1991 |
| JP | 2002-145947 A | 5/2002 |
| JP | 2002-155109 A | 5/2002 |

OTHER PUBLICATIONS

T.C. Chung et al.; Macromolecules, vol. 26, No. 14, Jul. 5, 1993, pp. 3467-3471.

* cited by examiner

Primary Examiner—James J. Seidleck
Assistant Examiner—Olga Asinovsky
(74) Attorney, Agent, or Firm—Birch, Stewart, Kolasch & Birch, LLP

(57) ABSTRACT

A branched olefin copolymer demonstrating excellent performance in various uses, comprising a building block (A) represented by formula (1) below and a building block (B) represented by formula (2) below, obtained by e.g. a method which involves sequentially conducting (step 1) a step of synthesizing a polar group-containing olefin copolymer (Q) containing at least one functional group (G) selected from a hydroxyl group, a carboxylic acid group, an ester group, an amino group, an epoxy group, a silanol group and an acid anhydride group, (step 2) a step of converting the functional group (G) into a group having an ability to initiate radical polymerization, and (Step 3) a step of installing a polymer segment (Z) by radical polymerization of a monomer essentially comprising carbon-carbon double bond-containing compound (R) containing at least one selected from an oxygen atom, a nitrogen atom, a halogen atom and an aryl group;

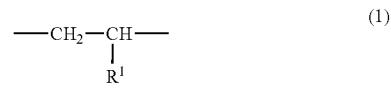

(1)

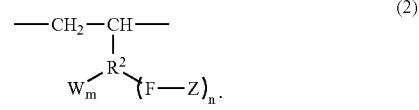

(2)

7 Claims, No Drawings

BRANCHED OLEFIN COPOLYMER, PROCESS FOR PRODUCING THE SAME, AND USE THEREOF

This nonprovisional application claims priority under 35 U.S.C. § 119(a) on Patent Application No. 2002-298420 filed in Japan on Oct. 11, 2002, which is herein incorporated by reference.

TECHNICAL FIELD

The present invention relates to a branched olefin copolymer and a process for producing the same and in particular to a branched olefin copolymer whose branched moiety is formed by radical polymerization reaction or anion polymerization reaction, a process for producing the same, and uses thereof.

BACKGROUND ART

Generally, the polyolefin is characterized by being superior in moldability, heat resistance, mechanical properties, chemical resistance, hygiene suitability and water-resistant steam permeability and excellent in the outward appearance of its molded articles, and is thus used widely in extrusion-molded articles, hollow molded articles, and injection-molded articles.

However, the polyolefin generally does not contain a polar group in its molecule and is thus poor in compatibility with polar resin such as nylon and EVOH and in adhesion to polar resin and metal, to make it hardly utilizable as a blend or a laminate with such materials.

To solve these problems, a method of improving the affinity of the polyolefin for polar resin by grafting a polar group-containing monomer onto the polyolefin has been widely carried out. In this method, however, the polyolefin undergoes intermolecular crosslinkage or molecular-chain cleavage together with the graft reaction, and therefore the resulting graft polymer hardly matches with the viscosity of polar resin or is poor in compatibility therewith in some cases. Further, a gelled material formed through intermolecular crosslinkage or molecular-chain cleavage can deteriorate the outward appearance of its molded articles.

JP-A 2-51511 and JP-A 3-177403 describe a method of copolymerizing α-olefin with a polar group-containing monomer by using a titanium- or vanadium-based catalyst. According to this method, the intermolecular crosslinkage and molecular-chain cleavage described above hardly occur, but the molecular structure of the resulting copolymer is heterogeneous, that is, the molecular-weight distribution is broad, or the inversion content is high, and thus the orientation of polar groups in an interface between themselves and a polar substance is not sufficient, resulting sometimes in insufficient adhesion to and compatibility with the polar substance.

JP-A2002-145947 and JP-A2002-155109 filed by the present applicant disclose a new branched polar group-containing olefin copolymer, a process for producing the same, a thermoplastic resin composition comprising the same, and uses thereof, to solve a majority of the problems. According to the disclosure, a branched moiety of the branched polar group-containing olefin copolymer is prepared and added by any chain extension reaction such as anion polymerization, ring-opening polymerization and polycondensation.

However, there is the problem of a limitation to starting monomers usable in the chain extension reaction. Particularly, the polycondensation reaction is not only subject to a severe limit to usable starting monomers, but is also subject to severe reaction conditions in general, thus sometimes causing deterioration in the polymer. From this viewpoint, there is demand for further improved branched olefin copolymers.

T. C. Chung et al. reported, in U.S. Pat. No. 5,286,800 and U.S. Pat. No. 5,401,805, techniques of obtaining polar group-containing olefin copolymers by adding alkyl borane such as 9-BBN to the terminal of the main or side chain of polyolefin and then radically polymerizing in the presence of oxygen the resulting polymer with methyl methacrylate (MMA) etc. However, the alkyl borane used in such techniques is generally expensive and unsuitable for industrial production. Further, the report of T. C. Chung et al. describes polymerization examples under heterogeneous conditions only at a MMA polymerization temperature of from room temperature to 60° C., but does not describe polymerization examples at high temperatures advantageous to higher reaction rate. It is noted that in the techniques of T. C. Chung et al., a radical polymerization-initiating terminal should be generated by using oxygen, and thus the radical polymerization reaction is inhibited due to the influence of residual oxygen, or proper active species are not formed due to oxidation into borate or boronate Macromolecules, 26, 3467 (1993), thus making it difficult to regulate the structure of the radically polymerized moiety.

The present invention was made to solve the above problems. That is, the object of the present invention is to provide a branched olefin copolymer particularly containing various polar functional groups in a branched region, which is excellent in adhesion to or compatibility with metal or polar resin, a process for efficiently producing the same, and uses thereof.

DISCLOSURE OF INVENTION

The branched olefin copolymer (P) of the present invention comprises a building block (A) represented by formula (1) and a building block (B) represented by formula (2):

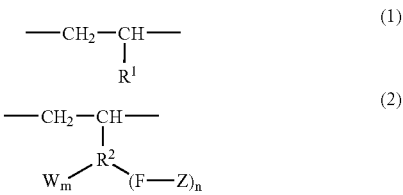

wherein the formula (1), $R^1$ represents a hydrogen atom and a $C_{1-18}$ linear or branched aliphatic hydrocarbon group; in the formula (2), $R^2$ represents a $C_{1-18}$ linear or branched aliphatic or aromatic hydrocarbon group; F represents a heteroatom or a heteroatom-containing linking group; Z represents a polymer segment containing at least one selected from an oxygen atom, a nitrogen atom, a halogen atom and an aryl group and having a molecular-weight distribution of 1.0 to 3.0; W represents a group selected from an alcoholic hydroxyl group, a phenolic hydroxyl group, a carboxylic acid group, a carboxylate group, an acid anhydride group, an amino group, an epoxy group, a siloxy group and a mercapto group; n is an integer of 1 to 3 and m is 0, 1 or 2 provided that when n is 2 or 3, Z may be the same or different to each other, and when m is 2, W may be the same or different to each other; and W may be bound to the same or different atom of $R^2$ to form a cyclic structure.

In a preferable mode of the branched olefin copolymer (P) of the present invention, the linking group represented by F in the formula (2) contains at least one group selected from a carbonyl group and an aryl group.

The branched olefin copolymer (P) of the present invention is obtained efficiently by either Production Method (M-1) or (M-2) described below. Production Method (M-1) is used preferably when a heteroatom or a heteroatom-containing linking group (F) in the branched olefin copolymer (P) is a group other than a group containing an ether group only, while Production Method (M-2) is a production method used preferably when the linking group (F) is a group containing an ether linkage only.

Production Method (M-1) is a production method wherein the following steps 1, 2 and 3 are sequentially carried out.

(Step 1) A step of synthesizing a polar group-containing olefin copolymer (Q) containing at least one functional group (G) selected from a hydroxyl group, a carboxylic acid group, an ester group, an amino group, an epoxy group, a silanol group and an acid anhydride group.

(Step 2) A step of installing a group having an ability to initiate radical polymerization to the functional group (G).

(Step 3) A step of installing a polymer segment (Z) in the building block (B) represented by the formula (2) in the branched olefin copolymer (P) by radical polymerization of a monomer essentially comprising a carbon-carbon double bond-containing compound (R) containing at least one selected from an oxygen atom, a nitrogen atom, a halogen atom and an aryl group.

Production Method (M-2) is a production method wherein the following steps 1', 2' and 3' are sequentially carried out.

(Step 1 ') A step of synthesizing a polar group-containing olefin copolymer (Q) containing at least one functional group (G) selected from a hydroxyl group, a carboxylic acid group, an ester group, an amino group, an epoxy group, a silanol group and an acid anhydride group.

(Step 2 ') A step of converting the functional group (G) into a group having an ability to initiate anion polymerization.

(Step 3') A step of installing a polymer segment (Z) in the building block (B) represented by the formula (2) in the branched olefin copolymer (P) by anion polymerization (excluding ring-opening anion polymerization) of a monomer essentially comprising a carbon-carbon double bond-containing compound (R) containing at least one selected from an oxygen atom, a nitrogen atom, a halogen atom and an aryl group.

The thermoplastic resin composition of the present invention comprises the above branched olefin copolymer (P), and is used for various purposes.

Further, the present invention relates to a film, a sheet, an adhesive resin, a compatibilizing agent, a resin modifier, a lubricant oil modifier, a cement modifier, a building material/civil engineering material, an electrically insulating material for electrical and electronic parts, a magnetic recording medium, an automobile interior and exterior material, a gasoline tank, a filler dispersant or a dispersant, an aqueous emulsion, a coating base, a medical and hygienic material, and sundries, which comprise the branched olefin copolymer (P) described above.

Further, the present invention relates to a sheet, an adhesive resin, a compatibilizing agent, a resin modifier, a lubricant oil modifier, a cement modifier, a building material/civil engineering material, an electrically insulating material for electrical and electronic parts, a magnetic recording medium, an automobile interior and exterior material, a gasoline tank, a filler dispersant or a dispersant, an aqueous emulsion, a coating base, a medical and hygienic material, and sundries, which comprise the thermoplastic resin composition described above.

BEST MODE FOR CARRYING OUT THE INVENTION

Hereinafter, the branched olefin copolymer, the process for producing the same, and uses thereof according to the present invention are described in more detail. The term "branched" in the present invention means that the side chain is branched by binding to not only a position ranging from the (ω-n)-position of the main chain (n is a positive integer of 1 or more), but also to the terminal (ω-position) of the main chain.

Branched Olefin Copolymer (P)

The branched olefin copolymer (P) of the present invention comprises a building block (A) represented by formula (1) and a building block (B) represented by formula (2):

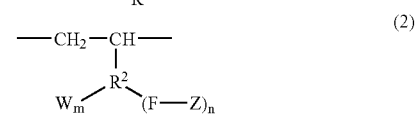

In the formula (1), $R^1$ represents a hydrogen atom or a $C_{1-18}$ linear or branched aliphatic hydrocarbon group. The $C_{1-18}$ linear or branched aliphatic hydrocarbon group includes, for example, methyl, ethyl, n-propyl, isopropyl, 2-methylpropyl, n-butyl, isobutyl, sec-butyl, tert-butyl, 1,1-dimethylpropyl, 2,2-dimethylpropyl, pentyl, neopentyl, n-hexyl, 1-ethyl-1-methylpropyl, 1,1-diethylpropyl, 2-ethylhexyl, octyl, decyl and dodecyl. Preferable among these groups is a group containing 1 to 10 carbon atoms, particularly 1 to 6 carbon atoms.

Now, the meaning of the symbols $R^2$, F, Z, W, m and n in the formula (2) and preferable examples thereof are described.

In the formula (2), $R^2$ represents a $C_{1-18}$ linear or branched aliphatic or aromatic hydrocarbon group, and includes the groups enumerated for $R^1$. Preferable among these groups is a group containing 1 to 10 carbon atoms, particularly 1 to 6 carbon atoms.

In the formula (2), F represents a heteroatom or a heteroatom-containing linking group for linking a polymer segment (Z) described below to the group $R^2$. The heteroatom includes, for example, an oxygen atom, a nitrogen atom, a sulfur atom, a silicon atom and a phosphorus atom, among which an oxygen atom is preferable. The heteroatom-containing group includes, for example, an ester group, an amido group, a ketone group, an ether group, an urethane group, a cyano group, a sulfonyl group, and a thioester group, among which an ester group and an ether group are preferable, and an ester group is particularly preferable.

In the formula (2), W represents a group selected from an alcoholic hydroxyl group, a phenolic hydroxyl group, a carboxylic acid group, a carboxylate group, an acid anhydride group, an amino group, an epoxy group, a silanol group and a mercapto group, among which a carboxylic acid group and an alcoholic hydroxyl group are preferable.

In the formula (2), n is an integer of 1 to 3, and m is 0, 1 or 2, provided that when n is 2 or 3, Z groups may be the same or different to each other, and when m is 2, W groups may be the same or different to each other, and W may be bound to the same or different atom of $R^2$ to form a cyclic structure.

The building block (B) represented by the formula (2) includes, for example, building blocks represented by the following formulae (3) to (5):

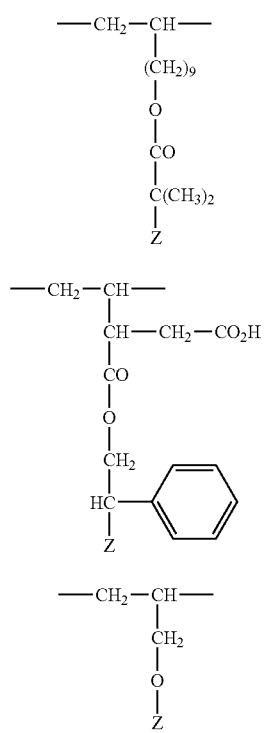

The skeleton represented by the formula (3) above corresponds to a skeleton of formula (2) wherein $R^2$ is a methylene group, m is 0, n is 1, and the linking group (F) is —O—CO—C(Me)$_2$—.

The skeleton represented by the formula (4) above corresponds to a skeleton of formula (2) wherein m is 1, n is 1, W represents a carboxyl group (—CO$_2$H), and $R^2$ represents an ethylene group bound to the —CO$_2$H group, and F represents an ester-containing group (—(CO)O—CH$_2$—CH(Ph)—) extending from the ethylene group The skeleton represented by the formula (5) above corresponds to a skeleton of formula (2) wherein $R^2$ is a methylene group, m is 0, n is 1, and the linking group (F) is —O—.

Now, preferable examples of the building block (B) represented by formula (2) are shown in chemical structure.

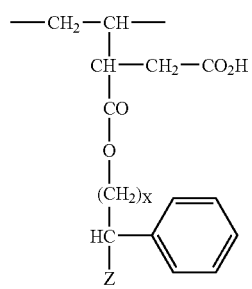

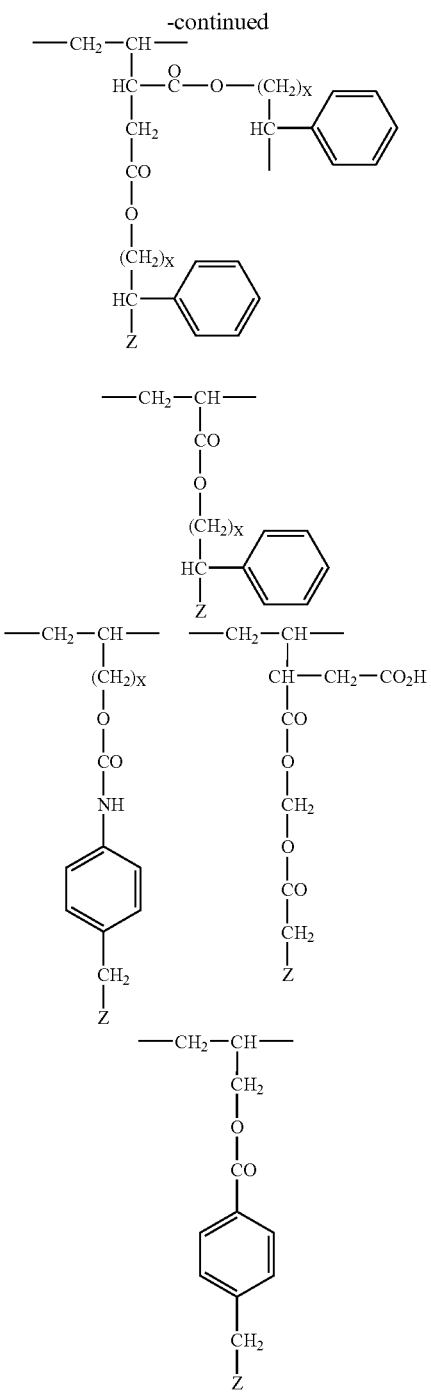

In these formulae, x is an integer of 0 to 15.

In the formula (2), Z is a polymer segment containing at least one selected from an oxygen atom, a nitrogen atom, a halogen atom and an aryl group, and it is specifically a polymer consisting of a monomer essentially comprising a carbon-carbon double bond-containing compound (R) containing at least one selected from an oxygen atom, a nitrogen atom, a halogen atom and an aryl group as described below.

The molecular weight of the polymer segment Z is not particularly limited, and the weight-average molecular weight (Mw) is usually in the range of 100 to 100,000, preferably 500 to 50,000. The molecular-weight distribution (Mw/Mn) of the polymer segment (Z) in the branched olefin copolymer (P) of the present invention is particularly important from the viewpoint of efficiently exhibiting the physical properties of the side-chain segment when the branched olefin copolymer (P) is used for various purposes. Usually, the molecular-weight distribution (Mw/Mn) of the polymer segment (Z) is 1.0 to 3.0, preferably 1.0 to 2.5, more preferably 1.0 to 1.8, still more preferably 1.0 to 1.5. When the polymer segment Z is installed by radical reaction, a residue derived from the radical polymerization-initiating functional group (P) or a residue derived from a compound added for terminating the polymerization may be installed to the terminal of the polymer segment (Z). Further, when Z is a monomer having an ester linkage or an amide linkage, the linkage can partially or entirely saponified or hydrolyzed to improve the physical properties conferred on Z. Further, various metal compounds can also be added to improve the polarity, electrical conductivity, mechanical physical properties and abrasion resistance of the Z segment.

In the branched olefin copolymer of the present invention, the molar ratio of the building block (A) represented by the formula (1) to the building block (B) represented by the formula (2), that is, ((A):(B)), is usually 99.95:0.05 to 10:90, preferably 99.90:0.10 to 30:70.

Now, the process for producing the branched olefin copolymer according to the present invention is described in more detail.

The branched olefin copolymer (P) of the present invention can be obtained efficiently by either Production Method (M-1) or (M-2) described below. Production Method (M-1) is used preferably when a heteroatom or a heteroatom-containing linking group (F) in the branched olefin copolymer (P) is a group containing a carbonyl and/or an aryl group, while Production Method (M-2) is a production method used preferably when the linking group (F) is a group containing an ether group.

Hereinafter, Production Methods (M-1) and (M-2) are described in more detail.

Production Method (M-1)

The branched olefin copolymer (P) of the present invention is produced by conducting the following steps 1, 2 and 3 sequentially.

(Step 1) A step of synthesizing a polar group-containing olefin copolymer (Q) containing at least one functional group (G) selected from a hydroxyl group, a carboxylic acid group, an ester group, an amino group, an epoxy group, a silanol group and an acid anhydride group.

(Step 2) A step of installing a group having an ability to initiate radical polymerization to the functional group (G).

(Step 3) A step of installing a polymer segment (Z) in the building block (B) represented by the formula (1) in the branched olefin copolymer (P) by radical polymerization of a monomer essentially comprising a carbon-carbon double bond-containing compound (R) containing at least one selected from an oxygen atom, a nitrogen atom, a halogen atom and an aryl group.

Now, each step of the production method of the present invention is described in more detail.

Step 1 is a step of synthesizing a polar group-containing olefin copolymer (Q) containing at least one functional group (G) selected from a hydroxyl group, a carboxylic acid group, an ester group, an amino group, an epoxy group, a silanol group and an acid anhydride group. The polar group-containing olefin copolymer (Q) can be produced by known methods disclosed in for example JP-A 2002-155109, JP-A 2000-29031, JP-A 8-109218 and JP-A 2002-167412. Specifically, the polar group-containing olefin copolymer (Q) can be produced by using a known Ziegler-Natta catalyst or a metallocene catalyst by copolymerizing α-olefins containing 3 to 20 carbon atoms, such as ethylene, propylene, 1-butene, 4-methyl-1-pentene and 1-hexene; unsaturated alcohols whose linear hydrocarbon moiety is linear, such as allyl alcohol, 4-penten-1-ol and 5-hexen-1-ol; alkenylcarboxylic acids such as 5-hexenoic acid, 6-heptenoic acid, 7-octenoic acid, 8-nonenoic acid and 9-decenoic acid; alkenyl carboxylates such as methyl 3-butenate, methyl 5-hexenate, and methyl 6-heptenate; alkenyl amines such as allyl amine, 5-hexene amine, and 6-heptene amine; (2,7-octadienyl)succinic anhydride, pentapropenylsuccinic anhydride, and alkenyl-containing acid anhydrides such as compounds wherein the carboxylic acid group in the above alkenylcarboxylic acid group is replaced by a carboxylic anhydride group.

Techniques for obtaining the polar group-containing olefin copolymer by grafting a polar group onto polyolefin as melt in an extruder are known, and polyolefin (particularly maleic anhydride-grafted polyolefin) obtained by grafting an ethylenically unsaturated carboxylic acid and its derivative has already been industrialized. The polar group-containing olefin copolymer is obtained typically by reacting maleic anhydride with a melted olefin polymer under high shear stress.

In this manner, the polar group-containing olefin copolymer (Q) having a functional group (G) such as an alcoholic hydroxyl group, a primary amino group, a secondary amino group, a carboxylic acid group, an ester group, a silanol group, an acid anhydride group and an epoxy group introduced into it can be produced. The molecular weight of the polar group-containing olefin copolymer (Q) is usually in the range of 500 to 500,000, preferably 2,000 to 200,000 in terms of weight-average molecular weight (Mw).

Step 2 is a step of installing a group having an ability to initiate radical polymerization to the functional group (G) by reacting the polar group-containing olefin copolymer (Q) obtained in step 1 with a compound having a group having an ability to initiate radical polymerization. The performance required of the compound having a group (S) having an ability to initiate radical polymerization should satisfy the following two requirements:

1) it shall possess a functional group (R) capable of chemical bonding to the functional group (G); and
2) it shall possess a functional group (S) to initiate radical polymerization.

The functional group (R) satisfying the requirement 1) includes, but is not limited to, an alcoholic hydroxyl group, a phenolic hydroxyl group, an amino group, a carboxylic acid group, an ester group, an alkyl halide group, an acid anhydride group, a carboxylic acid halide group etc.

The functional group satisfying the requirement 2) includes, for example, groups having nitroxide bound thereto to generate radicals upon thermal cleavage as disclosed in Trend Polym. Sci., 4, 456 (1996), or groups having terminal halogen atoms and generating radicals upon addition of metal such as RuCl or CuCl as disclosed in Macromolecules, 28, 1721 (1995) and Science, 272, 866 (1996).

The group (S) having an ability to initiate radical polymerization includes compounds such as a 2,2,6,6-tetramethylpiperidinyl-1-oxy (TEMPO) group, a 4-hydroxy-2,2,6,6-tetramethylpiperidinyl-1-oxy group, a 2,2,5,5-tetramethyl-1-pyrrolidinyloxy group, a 3-amino-2,2,5,5-tetramethyl-1-pyrrolidinyloxy group, a 3-carboxy-bromo group, a 2,2,5,5-tetramethyl-1-pyrrolidinyloxy group, a di-t-butylnitroxy group, a bromo group, a chloro group etc. Among these compounds, a 2,2,6,6-tetramethylpiperidinyl-1-oxy (TEMPO) group and a bromo group are preferable.

In the reaction of the polar group-containing olefin copolymer (Q) with a compound having the group (S) having an ability to initiate radical polymerization, which is carried out to add the group (S) having an ability to initiate radical polymerization to the functional group (G) in the polar group-containing olefin copolymer (Q), an anhydrous organic solvent can be generally used, but preferably the reaction is carried out in a hydrocarbon-based organic solvent highly compatible with polyolefin, such as toluene, benzene, hexane, heptane etc. at a temperature in the range of 0 to 120° C. The reaction may be homogeneous or heterogeneous, preferably homogenous. When the reaction hardly proceeds, a Brensted acid such as sulfuric acid, formic acid or p-toluenesulfonic acid or a Lewis acid such as aluminum chloride may be used as a catalyst. When water is generated in the reaction, the water maybe removed by adding magnesium sulfate anhydride or molecular sieves or under reflux using Dienstag in order to allow the reaction to proceed efficiently. The ratio (equivalent ratio) of the compound having the group (S) having an ability to initiate radical polymerization to the functional group (G), in terms of (G):(S), is usually 1:0.1 to 1:100, preferably 1:1 to 1:30. The polar group-containing olefin copolymer having the group having an ability to initiate radical polymerization, obtained by the reaction, can be isolated by precipitation with methanol or acetone and subsequent filtration. If necessary, the unreacted compound having the group (S) having an ability to initiate radical polymerization can be easily removed by washing with a solvent in which the compound having the group (S) having an ability to initiate radical polymerization is dissolved.

Step 3 is a step of installing a polymer segment (Z) to the product obtained in step (2), by radical polymerization of a monomer essentially comprising a carbon-carbon double bond-containing compound (R) containing at least one selected from an oxygen atom, a nitrogen atom, a halogen atom and an aryl group.

The carbon-carbon double bond-containing compound (R) containing at least one selected from an oxygen atom, a nitrogen atom, a halogen atom and an aryl group, used in the radical polymerization reaction, includes for example acrylic acid, methyl acrylate, ethyl acrylate, i-propyl acrylate, n-butyl acrylate, t-butyl acrylate, hydroxyethyl acrylate, methacrylic acid, methyl methacrylate, ethyl methacrylate, i-propyl methacrylate, n-butyl methacrylate, t-butyl methacrylate, isobutyl methacrylate, glycidyl methacrylate, aminoethyl methacrylate, 2-ethylhexyl methacrylate, n-dodecyl methacrylate, benzyl methacrylate, cyclohexyl methacrylate, bornyl methacrylate, acrylonitrile, methacrylonitrile, butyl vinyl ether, vinylidene chloride, vinyl chloride, vinyl acetate, hydroxyethyl methacrylate, hydroxyethyl acrylate, 2-hydroxyethyl methacrylate, dimethyl fumarate, diethyl fumarate, diisopropyl fumarate, di-t-butyl fumarate, dicyclohexyl fumarate, 4-hydroxybutyl 2-propenoate, 4-chlorostyrene, 4-trifluorostyrene, 4-methoxycarbonylstyrene, acrylamide, N,N-dimethylacrylamide, N,N-diethylacrylamide, 2,5-norbornene-2,3-dicarboxylic acid, styrene and 4-methylstyrene. In the radical polymerization in step 3, the monomer (R) is subjected to radical polymerization if necessary in the presence of at least one olefin (R') selected from ethylene and α-olefins containing 3 or more carbon atoms. The amount of the optionally used at least one olefin (R') selected from ethylene and α-olefins containing 3 or more carbon atoms, in terms of the ratio of R'/(R+R'), is usually 0 to 50 mol %, preferably 0 to 30 mol %.

The radical polymerization according to the present invention is carried out if necessary in the presence of a catalyst. The catalyst includes, for example, CuBr, CuCl, RuCl, RuCl$_2$, FeCl, FeCl$_2$ etc. When the catalyst is used, the amount of the catalyst used is 0.01 to 10 equivalents, preferably 0.1 to 2 equivalents, relative to the group (S) having an ability to initiate radical polymerization. Coordinating fatty amines or aromatic amines may be added to increase the solubility of the catalyst in the reaction system, or alkoxy aluminum may be added as a reaction accelerator. If necessary, a radical chain transfer agent can also be added.

Now, the conditions for the polymerization reaction are described in more detail.

Specifically, the solvent used in the reaction includes aliphatic hydrocarbons such as propane, butane, pentane, hexane, heptane, octane, decane, dodecane and petroleum; alicyclic hydrocarbons such as cyclopentane, cyclohexane and methylcyclopentane; aromatic hydrocarbons such as benzene, toluene, xylene and mesitylene; halogenated hydrocarbons such as ethylene chloride and chlorobenzene, and a combination thereof. Among these, aliphatic hydrocarbons are particularly preferably used. To inhibit side reactions, the oxygen contained in the solvent used is preferably removed.

The reaction is carried out at a temperature in the range of 0 to 200° C., preferably room temperature to 150° C., more preferably a temperature in the range of 60 to 130° C. in an inert atmosphere. The reaction may be homogenous or heterogeneous, preferably homogeneous. The amount of the radical polymerizable monomer added is controlled depending on the molecular weight of the desired branched olefin copolymer, and the ratio of the group (S) having an ability to initiate radical polymerization to the radical polymerizable monomer, in terms of the equivalent ratio of (S): (amount of carbon-carbon double bonds in the monomer), is usually 1:2 to 1:1000, preferably 1:5 to 1:500. After the reaction is terminated with methanol or isobutyl alcohol, the polymer is precipitated by pouring the reaction solution into e.g. a large amount of methanol, then separated by filtration and dried, whereby the desired branched olefin copolymer (P) can be isolated. If necessary, the resulting branched olefin copolymer (P) can be treated with a polar solvent such as acetone or THF in a Soxhlet extraction device to remove a homo-radical polymer formed as a byproduct.

Production Method (M-2)

Production Method (M-2) is a production method wherein the following steps 1', 2' and 3' are sequentially carried out.

(Step 1') A step of synthesizing a polar group-containing olefin copolymer (Q) containing at least one functional group (G) selected from a hydroxyl group, a carboxylic acid group, an ester group, an amino group, an epoxy group, a silanol group and an acid anhydride group.

(Step 2') A step of converting the functional group (G) into a group having an ability to initiate anion polymerization.

(Step 3') A step of installing a polymer segment (Z) in the building block represented by the formula (2) in the branched olefin copolymer by anion polymerization (excluding ring-opening anion polymerization) of a monomer essentially comprising a carbon-carbon double bond-containing compound (R) containing at least one selected from an oxygen atom, a nitrogen atom, a halogen atom and an aryl group.

Hereinafter, each step of the production method of the present invention is described.

Step 1' is a step of synthesizing a polar group-containing olefin copolymer (Q) containing at least one functional group (G) selected from a hydroxyl group, a carboxylic acid group, an ester group, an amino group, an epoxy group, a silanol group and an acid anhydride group, and this production method includes the same method as described in Production Method (M-1) above. In Production Method (M-2), the polar group-containing olefin copolymer (Q') having a hydroxyl group as the functional group (G) is preferably used.

Step 2' is a step of converting the functional group (G) into a group having an ability to initiate anion polymerization. Specifically, the polar group-containing olefin copolymer (Q') is converted into an olefin copolymer having lithium at the terminal by reacting a hydroxyl group bound via a carbon atom to the terminal of the main and/or side chain of the copolymer (Q') with an organolithium compound. The reaction of the polar group-containing olefin copolymer (Q') having a hydroxyl group at the terminal with the organolithium compound is carried out usually in a solvent.

The organolithium compound includes alkyl lithium such as butyl lithium, propyl lithium, ethyl lithium and methyl lithium and alkoxy lithium such as butoxy lithium, propoxy lithium, ethoxy lithium and methoxy lithium. In the present invention, the alkyl lithium is used more preferably.

Specifically, the solvent used in the reaction includes aliphatic hydrocarbons such as propane, butane, pentane, hexane, heptane, octane, decane, dodecane and petroleum; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene, and a combination thereof. Among these, aliphatic hydrocarbons are particularly preferably used.

In the reaction of the olefin having a hydroxyl group at the terminal thereof with the organolithium compound, the organolithium compound is used in the range of 0.1 to 100 equivalents, preferably 0.2 to 10 equivalents relative to 1 equivalent of the hydroxyl group at the terminal of the polar group-containing olefin copolymer (Q'). The reaction temperature is usually −100 to 100° C., preferably 0 to 80° C., and the reaction time is usually 0.1 to 48 hours, preferably 0.5 to 12 hours.

In step 1', an organophosphorous compound can also be used in place of the organolithium compound. Preferable examples of the organophosphorous compound include halides, more preferably chlorides of
tris(dimethylamino)[tris(dimethylamino)phosphoranylidene amino]phosphonium,
tris(diethylamino){tris(diethylamino)phosphoranylidene amino} phosphonium,
bis(dimethylamino)bis[tris(dimethylamino)phosphoranylidene amino]phosphonium,
dimethylaminotris[tris(dimethylamino)phosphoranylidene amino]phosphonium,
tetrakis[tris(dimethylamino)phosphoranylidene amino] phosphonium, tetrakis[tris(morpholino)phosphoranylidene amino]phosphonium, and
tetrakis[tris(piperidino)phosphoranylidene amino]phosphonium.

The organophosphorous compound is preferably a compound easily generating cations, more preferably a compound easily generating phosphoranylidene amino phosphonium cations.

The carbon-carbon double bond-containing compound (R) containing at least one selected from an oxygen atom, a nitrogen atom, a halogen atom and an aryl group, used in step 3', can be the same compound as described in Production Method (M-1) above, and particularly (meth)acrylate or an aromatic vinyl compound is preferably used. In the anion polymerization in step 3', the monomer (R) is subjected to anion polymerization if necessary in the presence of at least one olefin (R') selected from ethylene and α-olefins containing 3 or more carbon atoms. The amount of the optionally used at least one olefin (R') selected from ethylene and α-olefins containing 3 or more carbon atoms, in term of R'/(R+R'), is usually 0 to 50 mol %, preferably 0 to 30 mol %.

The anion polymerization in step 3' is carried out by mixing a solvent with the lithium-terminated or phosphorous-containing polyolefin and (meth) acrylate or an aromatic vinyl compound or by mixing the lithium-terminated or phosphorous-containing polyolefin with liquid (meth) acrylate or an aromatic vinyl compound.

As the solvent used in step 3', use can be made of e.g. aliphatic hydrocarbons such as hexane and heptane; alicyclic hydrocarbons such as cyclopentane and cylohexane; aromatic hydrocarbons such as benzene and toluene; and ether solvents such as diethyl ether, dioxane, tetrahydrofuran (THF), monogrime and digrime. These solvents can be used alone or as a mixture of two or more thereof. In particular, aromatic hydrocarbons and ether solvents are preferably used.

For polymerization, compounds such as triphenylphosphine, α,α'-dipyridyl, hexamethylphosphoroamide (HMPA), titanium tetrachloride, alkyl lithium and alkoxy lithium may be added to accelerate formation of anion polymerization active species.

The anion polymerization is carried out usually at a polymerization temperature of −100° C. to 100° C., preferably −80° C. to 80° C., more preferably −70° C. to 70° C., for 1 minute to 500 hours, preferably 10 minutes to 300 hours, more preferably 15 minutes to 150 hours. In this polymerization, the Li-terminated polyolefin is used at a concentration of 0.001 to 100 mol/L, preferably 0.005 to 50 mol/L, more preferably 0.01 to 10 mol/L, still more preferably 0.1 to 5 mol/L. The (meth)acrylate or aromatic vinyl compound is used usually at a concentration of 0.001 to 500 mol/L, preferably 0.005 to 300 mol/L, more preferably 0.01 to 150 mol/L.

The branched olefin copolymer of the present invention can be used in various uses, for example in the following uses.

(1) Film and sheet: A film and sheet comprising the branched olefin copolymer of the present invention are superior in flexibility, transparency, tackiness, fog resistance, heat resistance and releasability.
(2) A laminate containing at least one layer consisting of the graft polymer having a polyolefin skeleton, for example an agricultural film, a wrapping film, a shrinking film, a protecting film, a membrane for separation of blood plasma components, a separation membrane such as a water-selective permeation vaporization membrane, and selective separation membranes such as an ion-exchange membrane, a battery separator and an optical resolution membrane.
(3) Microcapsules, PTP package, chemical pulp, drug delivery system.
(4) The branched olefin copolymer used as a modifier for modified resin exerts modification effects such as impact resistance, flowability, coating properties, crystallizability, adhesion and transparency.

The branched olefin copolymer used as a rubber modifier exhibits modification effects such as weatherability, heat resistance, adhesion and oil resistance. The rubber includes crosslinked rubber such as natural rubber (NR), isoprene rubber (IR), butadiene rubber (BR), styrene-butadiene rubber (SBR), chloroprene rubber (CR), acrylonitrile-butadiene rubber (NBR), butyl rubber (IIR), ethylene-propylene rubber (EPM, EPDM), chlorosulfonated polyethylene (CSM), acryl rubber (ACM, ANM etc.), epichlorohydrin rubber (CO, ECO etc.), silicone rubber (Q), fluorine rubber (FKM etc.) etc.; and thermoplastic rubber such as those based on styrene, olefin, urethane, ester, amide and vinyl chloride.

The branched olefin copolymer can be used as a modifier for lubricant oil, for example gasoline engine oil, diesel engine oil, engine oil for ship, gear oil, machine oil, metal processing oil, motor oil, machine oil, spindle oil, and lubricant oil such as insulating oil, or viscosity regulator, and a freezing-point depressant. The branched olefin copolymer used as a modifier for wax exhibits modification effects such as adhesion, flowability and strength. The wax includes mineral wax such as montan wax, peat wax, ozokerite/ceresin wax and petroleum wax, synthetic wax such as polyethylene, Fischer-Tropsch wax, chemically modified hydrocarbon wax and substituted amide wax, vegetable wax and animal wax.

The branched olefin copolymer used as a cement modifier has modification effects such as moldability and strength. The cement includes air-setting cement such as lime, gypsum and magnesia cement, hydraulic cement such as roman cement, natural cement, Portland cement, alumina cement and high sulfate slag cement, and special cement such as acid-resistant cement, refractory cement, water glass cement, and dental cement.

(5) The branched olefin copolymer is used as a viscosity regulator, a moldability improver, ink such as a letterpress ink, a lithographic ink, a flexographic ink and a gravure ink, an oil paint, a cellulose derivative paint, a synthetic resin paint, an aqueous baking paint, a powdery aqueous paint, a viscosity regulator for ink/coating such as Japanese lacquer, and a moldability modifier.

(6) Building materials/materials for civil engineering, for example, resin for building materials/civil engineering and molded articles for building materials/civil engineering such as floor materials, floor tiles, floor sheet, sound insulating sheet, thermally insulating panels, vibration insulating material, decorative sheet, baseboard, asphalt modifier, gasket/sealing material, roofing sheet, waterstop sheet etc.

(7) Automobile interior and exterior materials and gasoline tank; Automobile interior and exterior materials and gasoline tank comprising the branched olefin copolymer of the present invention are excellent in rigidness, impact resistance, oil resistance and heat resistance.

(8) Electrically insulating materials for electrical and electronic parts; tools for treatment of electronic parts; electrical and electronic parts such as a magnetic recording medium, a binder in a magnetic recording medium, a sealing material in an electrical circuit, a material for home appliances, an equipment part for a container such as a container for a microwave oven, a film for a microwave oven, a high-molecular electrolyte base material, an electroconductive alloy base material, a connector, a socket, a resistor, a relay case switch coil bobbin, a condenser, a hair clipper case, a light pickup, a light connector, an oscillator, various terminal boards, a transformer, a plug, a print circuit board, a tuner, a speaker, a microphone, a head phone, a small motor, a magnetic head base, a power module, a housing, a semiconductor, liquid crystalline parts, an FDD carriage, an FDD chassis, HDD parts, a motor brush holder, a parabola antenna, and computer-related parts; VTR parts, TV parts, an iron, a hair dryer, rice cooker parts, microwave oven parts, audio parts, audio instrument parts such as audio/laser disk (registered trademark)/compact disk, lighting parts, refrigerator parts, air-conditioner parts, typewriter parts, home and office electrical product parts such as word processor parts, office computer-related parts, telephone-related parts, facsimile-related parts, copying machine-related parts, electromagnetic shielding materials, speaker cone material, vibrating elements for speakers, etc.

(9) An aqueous emulsion: An aqueous emulsion containing the branched olefin copolymer of the present invention improves abrasion resistance, metal adhesion, lubricating properties, and rust prevention, thus exhibiting excellent performance as an aqueous ink abrasion-resistant agent, a lubricant for aqueous paints, a blocking inhibitor, an aqueous ink anti-sliding agent, an emulsion modifier, a coating for aluminum and a rust preventing coating material for steel plates. Further, it can be an adhesive for polyolefin excellent in heat sealing.

(10) A coating base: A solvent dispersion containing the branched olefin copolymer of the present invention is excellent in dispersion stability in solvent, and shows good adhesion upon adhesion of metal or polar resin to polyolefin.

(11) Medical articles such as medical and hygienic non-woven fabrics, a laminate of nonwoven fabrics, electrets, a medical tube, a medical container, a blood transfusion bag, a pre-filled syringe, a false-tooth material, a hypodermic syringe, medical materials, artificial organs, artificial muscles, filtration membrane, food hygiene/health articles; a retort bag, freshness-keeping film etc.

(12) A sundry desk mat, a cutting mat, a ruler, a pen body/grip/cap, grips of scissors and cutter, a magnetic sheet, a pen case, a paper holder, a binder, a label sheet, a tape, writing materials such as white board; daily sundries such as clothing, a curtain, a sheet, a carpet, an entrance mat, a bath mat, a bucket, a hose, a bag, a planter, a filter in an air conditioner or a ventilation fan, tableware, a tray, a cup, a lunch box, a funnel for coffee siphon, a glass frame, a container, a storage case, a hanger, a rope and a washing net; sporting articles such as shoes, goggles, ski boots, a racket, a ball, a tent, swimming goggles, fins, a fishing rod, a cooler box, a leisure sheet and a sporting net; toys such as block and card; containers such as petroleum can, drum can, and bottles for detergent and shampoo; and displays such as signboard, pylon and plastic chain.

(13) A filler modifier: The branched olefin copolymer of the present invention can be used preferably as an improver for filler dispersibility and an additive for preparation of fillers with improved dispersibility.

(14) Compatibilizing agents: The branched olefin copolymer of the present invention can be used as a compatibilizing agent. When the graft polymer having a polyolefin skeleton according to the present invention is used, polyolefin and thermoplastic resin having polar groups can be mixed in an arbitrary ratio. The graft polymer having a polyolefin skeleton according to the present invention has polyolefin segments and functional segments and can thus make originally non-compatible components compatible with one another and can improve elongation at breakage significantly as compared with the case where the graft polymer having a polyolefin skeleton is not used.

EXAMPLES

Hereinafter, the present invention is described in more detail by reference to the Examples, but the present invention is not limited thereto.

Example 1

[Preparation of Polar Group-Containing Olefin Copolymer Modified with 2-bromoisobutyryl Group]

12 g ethylene/10-undecen-1-ol copolymer (Mw=47200, Mw/Mn=1.98, comonomer content 3.6 mol %) produced according to a method described in Chem. Lett., 2001, 710–711 was introduced into a 1 L two-necked eggplant type flask purged with nitrogen, then 500 ml dry toluene, 32 ml triethylamine and 12.9 ml 2-bromoisobutyric acid bromide were added thereto, and the mixture was heated at 80° C. and stirred under heating for 2 hours. The reaction solution was poured into 2 L methanol, and the precipitated polymer was filtered with a glass filter. The polymer on the glass filter was washed 3 times with 100 ml methanol, once with 100 ml of 1 N hydrochloric acid, and twice with 100 ml methanol. The polymer was dried at 50° C. under the reduced-pressure condition of 10 Torr for 10 hours. As a result of $^1$H-NMR, a polar group-containing olefin copolymer having 99% terminal OH groups modified with 2-bromoisobutyric acid groups (2-bromoisoburytic acid group-modified PE) was obtained.

[Production of a Branched Olefin Copolymer (PE-g-PMMA-1) and Confirmation of the Molecular Weight of its Side Chain]

A 100 ml Schrenk flask purged with nitrogen was charged with 215 mg (1.50 mmol) copper(I) chloride, 1.50 ml (3.0 mmol) of 2 M N,N,N',N'',N''-pentamethyldiethyltriamine in xylene, 0.80 ml (7.5 mmol) methyl methacrylate and 27.7 ml o-xylene, and then fit with a septum cap. From the solution, a uniform solution (A) from which dissolved oxygen was removed was prepared by a freeze pump and thaw method. Separately, the above polar group-containing olefin copolymer (2-bromoisobutyric acid group-modified PE), 1.50 g (containing 1.50 mmol modified group), was introduced into another 100 ml Schrenk flask purged with nitrogen and then fit with a septum cap. The above solution (A) was transferred to this Schrenk flask, heated to 120° C. and reacted for 5 hours. The reaction mixture was cooled to room temperature, the reaction was terminated by adding about 5 ml methanol, and the reaction solution was poured into 500 ml methanol and stirred overnight. The precipitated polymer was separated by filtration with a glass filter, and the polymer was dried at 80° C. under the reduced-pressure condition of 15 Torr for 10 hours. By $^1$H-NMR measurement, a branched polar group-containing olefin copolymer containing 9.1 wt % methyl methacrylate copolymer (PE-g-PMMA-1) was obtained. The resulting PE-g-PMMA, 1.0 g, was placed in a 200 ml eggplant type flask, then 100 ml THF was added thereto, 3 ml of 5 mol/L aqueous sodium hydroxide was added thereto, and the suspension was stirred overnight at 50° C. The reaction solution was cooled to room temperature, and the resulting unsoluble polyethylene main chain cleaved by the hydrolysis was removed by filtration with a glass filter, then the organic phase was distilled away under reduced pressure, and the resulting side chain was analyzed by GPC. As a result, the side chain PMMA (or a hydrolyzate thereof) had a Mw of 980 and a Mw/Mn of 1.45.

Example 2

[Production of a Branched Olefin Copolymer (PE-g-PMMA-2)]

A 100 ml Schrenk flask purged with nitrogen was charged with 215 mg (1.50 mmol) copper(I) chloride, 1.50 ml (3.0 mmol) of 2 M N,N,N,'N,'',N,''-pentamethyldiethyltriamine in xylene, 9.62 ml (89.9 mmol) methyl methacrylate and 18.9 ml o-xylene, and then fit with a septum cap. From this solution, a uniform solution (A) from which dissolved oxygen was removed was prepared by a freeze pump and thaw method. Separately, the polar group-containing olefin copolymer (2-bromoisobutyric acid group-modified PE), 1.50 g (containing 1.50 mmol modified group), which was prepared in Example 1 was introduced into another 100 ml Schrenk flask purged with nitrogen, and the flask was fit with a septum cap. The above solution (A) was transferred to this Schrenk flask, heated to 120° C. and reacted for 5 hours. The reaction mixture was cooled to room temperature, the reaction was terminated by adding about 5 ml methanol, and the reaction solution was poured into 500 ml methanol and stirred overnight. The precipitated polymer was separated by filtration with a glass filter and then dried at 8° C. under the reduced-pressure condition of 15 Torr for 10 hours. By $^1$H-NMR measurement, a branched polar group-containing olefin copolymer containing 79.1 wt % methyl methacrylate polymer (PE-g-PMMA-2) was obtained. The resulting PE-g-PMMA, 1.0 g, was placed in a 200 ml eggplant type flask, 100 ml THF was added thereto, 3 ml of 5 mol/L aqueous sodium hydroxide was added thereto, and the suspension was stirred overnight at 50° C. The reaction solution was cooled to room temperature, and the resulting unsoluble polyethylene main chain cleaved by the hydrolysis was removed by filtration with a glass filter, then the organic phase was distilled away under reduced pressure, and the resulting side chain was analyzed by GPC. As a result, the molecular weight and molecular-weight distribution of the side chain PMMA (or a hydrolyzate thereof) were a Mw of 18100 and a Mw/Mn of 1.34, respectively

Example 3

[Production of a Branched Olefin Copolymer (PE-g-(MA-co-BA)]

A 100 ml Schrenk flask purged with nitrogen was charged with 215 mg (1.50 mmol) copper(I) chloride, 1.50 ml (3.0 mmol) of 2 MN,N,N',N'',N'''-pentamethyldiethyltriamine inxylene, 2.5 ml (32.2 mmol) methyl acrylate, 4.0 ml (27.9 mmol) butyl acrylate, and 26.5 ml o-xylene, and then fit with a septum cap. From this solution, a uniform solution (A) from which dissolved oxygen was removed was prepared by a freeze pump and thaw method. Separately, the polar group-containing olefin copolymer (2-bromoisobutyric acid group-modified PE), 1.50 g (containing 1.50 mmol modified group), which was prepared in Example 1 was introduced into another 100 ml Schrenk flask purged with nitrogen, and then fit with a septum cap. The above solution (A) was transferred to this Schrenk flask, heated to 110° C. and reacted for 3 hours. There action mixture was cooled to room temperature, the reaction was terminated by adding about 5 ml methanol, and the reaction solution was poured into 500 ml methanol and stirred overnight. The precipitated polymer was separated by filtration with a glass filter and then dried at 80° C. under the reduced-pressure condition of 15 Torr for 10 hours. By $^1$H-NMR measurement, a branched olefin copolymer containing 48 wt % methyl acrylate-butyl acrylate copolymer (PE-g-(MA-co-BA)) was obtained.

Example 4

[Production of a Branched Olefin Copolymer (PE-g-PS) and Confirmation of the Molecular Weight of its Side Chain]

A 100 ml Schrenk flask purged with nitrogen was charged with 215 mg (1.50 mmol) copper(I) chloride, 1.50 ml (3.0 mmol) of 2 M N,N,N',N'',N''-pentamethyldiethyltriamine in xylene, 10.3 ml (8.99 mmol) styrene and 18.2 ml o-xylene, and then fit with a septum cap. From this solution, a uniform solution (A) from which dissolved oxygen was removed was prepared by a freeze pump and thaw method. Separately, the polar group-containing olefin copolymer (2-bromoisobutyric acid group-modified PE), 1.50 g (containing 1.50 mmol modified group), which was prepared in Example 1 was introduced into a 100 ml Schrenk flask purged with nitrogen, and then fit with a septum cap. The above solution (A) was transferred to this Schrenk flask, heated to 120° C. and reacted for 5 hours. The reaction mixture was cooled to room temperature, the reaction was terminated by adding about 5 ml methanol, and the reaction solution was poured into 500 ml methanol and stirred overnight. The precipitated polymer was separated by filtration with a glass filter and then dried at 80° C. under the reduced-pressure condition of 15 Torr for 10 hours. By $^1$H-NMR measurement, a branched olefin copolymer containing 85.6 wt % styrene copolymer (PE-g-PS) was obtained.

The resulting PE-g-PS, 1.0 g, was placed in a 200 ml eggplant type flask, 100 ml THF was added thereto, 3 ml of 5 mol/L aqueous sodium hydroxide was added thereto, and the suspension was stirred overnight at 50° C. The reaction solution was cooled to room temperature, and the resulting unsoluble polyethylene main chain cleaved by the hydrolysis was removed by filtration with a glass filter, and the filtrate was washed twice with 50 ml pure water. The organic phase was distilled away under reduced pressure, and the resulting side chain was dried under reduced pressure (80° C., 10 hours). As a result of GPC analysis, the molecular weight and molecular-weigh distribution of the side-chain polystyrene were a Mw of 9400 and a Mw/Mn of 1.32, respectively.

Example 5

[Preparation of TEMPO-Modified Ethylene-Butene Copolymer (TEMPO-EBR)]

A maleic anhydride-grafted ethylene butene copolymer (MAH-EBR) (Mw=102000, ethylene:butene (molar ratio) =80:20, graft degree 0.75 wt %), 10 g, was placed in a 1 L two-necked eggplant type flask purged with nitgrogen, then 0.21 g (0.76 mmol) of TEMPO-modified compound X shown below, 500 ml dry toluene and 20 mgp-toluenesulfonic acid monohydrate were added thereto, the temperature of the mixture was increased to 80° C., and the mixture was stirred under heating for 6 hours. The reaction solution was poured into 2 L methanol, and the precipitated polymer was filtered with a glass filter. The polymer on the glass filter was washed 3 times with 100 ml methanol. The polymer was dried at 60° C. under the reduced-pressure condition of 15 Torr for 10 hours. As a result of $^1$H-NMR, a polar group-containing olefin copolymer (TEMPO-EBR) having 87% maleic anhydride groups esterified with the compound represented by formula (6) was obtained.

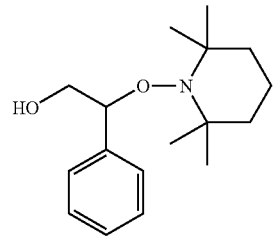

(6)

[Production of a Branched Olefin Copolymer (EBR-g-PS) and Confirmation of the Molecular Weight of its Side Chain]

A 200 ml three-necked flask equipped with a mechanical stirrer and purged with nitrogen was charged with 5.0 g polar group-containing olefin copolymer (having 0.33 mmol terminal modified group) obtained above, then 70 ml o-xylene and 6.5 ml styrene monomer were added thereto, and the temperature of the mixture was increased to 120° C. After stirred for 12 hours, the reaction solution was retuned to room temperature and then poured into 1 L methanol. The precipitated polymer was separated by filtration with a glass filter, and the polymer was dried at 80° C. under the reduced pressure condition of 15 Torr for 10 hours. By $^1$H-NMR measurement, a branched olefin copolymer containing 42 wt % styrene copolymer (EBR-g-PS) was obtained.

The resulting EBR-g-PS, 1.0 g, was placed in a 200 ml eggplant type flask, 100 ml THF was added thereto, 3 ml of 5 mol/L aqueous sodium hydroxide was added thereto, and the suspension was stirred overnight at 50° C. The reaction solution was cooled to room temperature, and the resulting EBR main chain cleaved by the hydrolysis was removed by filtration with a glass filter, and then the filtrate was washed twice with 50 ml pure water. The organic phase was distilled away under reduced pressure, and the resulting side chain was further dried under reduced pressure (80° C., 10 hours). As a result of GPC analysis, the molecular weight and molecular-weight distribution of the side chain polystyrene was a Mw of 4280 and a Mw/Mn of 1.23.

Example 6

[Preparation of an Ethylene/10-undecene-1-ol Copolymer]

10.0 mg bis(1,3-dimethylcyclopentadienyl) zirconium dichloride was placed in a glass vessel purged sufficiently with nitrogen, and a solution of methyl aluminoxane in toluene was added in an amount of 17.2 mmol in terms of aluminum atom and then irradiated with ultrasonic waves at 23° C. for 15 minutes. Then, a suitable amount of toluene was added to adjust the total volume to 50 ml and used as a catalyst solution.

A stainless steel autoclave having an internal volume of 1 L purged sufficiently with nitrogen was charged with 600 ml cyclohexane solution containing 21 g 10-undecen-1-ol at room temperature in a nitrogen atmosphere. Then, 150 mmol triisobutyl aluminum was added thereto, and the system was purged with ethylene. The system was pressurized with ethylene and heated so that the temperature in the system was 50° C. and the total pressure was 0.7 MPa. 12.8 ml of the catalyst solution prepared as described above was pressed with pressurized nitrogen into the autoclave to initiate polymerization. Thereafter, the polymerization was carried out at total pressure of 0.7 MPa at 50° C. for 30 minutes while ethylene only was supplied. 30 minutes after the polymerization was initiated, 50 ml isopropanol (IPA) was pressed with pressurized nitrogen into the autoclave to terminate the polymerization reaction.

After the pressure was released, the polymer solution was removed, and an aqueous solution containing 50 ml conc. hydrochloric acid per L water and the polymer solution were contacted with each other in a ratio of 1:1 under vigorous stirring with a homomixer, and catalyst residues were transferred to the aqueous phase. After this contacted mixed solution was left, the aqueous phase was separated and removed, and the polymer liquid phase was purified and separated by washing twice with water.

Then, the purified and separated polymer solution was contacted with a 3-fold excess amount of methanol under vigorous stirring to precipitate a copolymer, and then solids (copolymer) were collected by filtration and washed sufficiently with methanol. The solids were collected by filtration and dried at 80° C. under reduced pressure at 160 mmHg for 10 hours in a nitrogen stream.

The yield of the ethylene/10-undecen-1-ol copolymer thus obtained was 25.7 g. As a result of NMR analysis, the content of 10-undecen-1-ol was 2.5 mol %. As a result of GPC measurement, the Mw (weight-average molecular weight) was 80,000, and the Mw/Mn (number-average molecular weight) was 2.5. From the results of GPC measurement and NMR analysis, it was confirmed that a hydroxyl group was present at the terminal of the main and/or side chain of the resulting polyolefin.

[Production of a Branched Olefin Copolymer (PE-g-PMMA)]

30 ml toluene was added to 2.5 g of the above ethylene/10-undecen-1-ol copolymer, 1 ml of 1.6 M n-butyllithium in hexane was added thereto, and the mixture was stirred at room temperature for 24 hours. After the reaction, the slurry was cooled to −20° C., and the polyethylene separated by filtration was cooled to −20° C. and simultaneously washed several times with toluene. By $^1$H-NMR, it was confirmed that lithium was added to the terminal of the resulting ethylene/10-undecen-1-ol copolymer.

30 ml benzene and 30 ml methyl methacrylate (MMA) were added to 2.0 g of the resulting ethylene/10-undecen-1-ol copolymer having Li added to the terminal thereof, and the mixture was reacted at 20° C. for 100 hours under stirring with a magnetic stirrer. The reaction was terminated by adding methanol, and the reaction mixture was washed sufficiently with hexane and then dried at 45° C. under reduced pressure.

The degree of conversion of MMA was 10.5%, and the triad tacticity of the polyMMA segment of the resulting branched olefin copolymer (PE-g-PMMA) was 77%. By $^{13}$C-NMR, it was confirmed that the resulting branched olefin copolymer was a graft copolymer having polyethylene bound via ether oxygen to polyMMA.

Example 7

[Production of a Branched Olefin Copolymer (PE-g-PS)]

10 g of the Li-terminated ethylene/10-undecen-1-ol copolymer prepared in Example 6 was placed in a sealed flask, and 5.0 g dry styrene (St) and 50 ml THF were added to initiate reaction. The mixture was stirred at room temperature for 135 hours, and then 10 ml methanol was added to terminate the reaction. The precipitated polymer was extracted and separated with acetone and heptane over 24 hours in a nitrogen atmosphere in a Soxhlet extracting device, to give a branched olefin copolymer (PE-g-PS) as an insoluble component.

The branched olefin copolymer (PE-g-PS) prepared in this manner had a MFR (230° C.) of 14 g/10 minutes and a Mw/Mn of 2.5.

Example 8

The branched olefin copolymer (PE-g-PMMA) obtained in Example 6 was press-molded and tube-molded at 200° C. to give a test specimen. This test specimen was measured for various physical properties in the following manner. The results are shown in Table 1.

[JIS A Hardness (A)]
Measured in accordance with JIS K7215.

[Tensile Strength]
Measured at 23° C. with JIS dumbbell No. 3 with a gap of 20 mm between spans at a stress rate of 500 mm/sec. in accordance with JIS K6251.

[Adhesion Test]
Measured in accordance with JIS K6256.

[TMA (Needle Penetration Temperature: Heat Resistance)]
Needle penetration temperature was measured with an indenter of 1.8 mmφ under the conditions of 2 kg/cm$^2$ and an increasing temperature of 5° C./min.

[Surface Hardness (Shore A Hardness)]
Measured in accordance with ASTM D676.

[Marr Resistance (Martens Hardness)]
Martens hardness: A mar was given to a press test specimen by a diamond needle under 20 g loading, and the width of the mar was measured, and the reciprocal of this measurement was used as Martens hardness.

[Repeated Impulses]
An internal electroconductive layer was formed in a 1 mm conductor wire and provided therearound with an insulating layer (thickness 1.5 mm) of the test copolymer. A lightning impulse test of the resulting cable was carried out (with 100 kV applied at 5-minute intervals).

[Breakdown Voltage]
Measured at 25° C. with a 1 mm press sheet in accordance with ASTM D-149.

Comparative Example 1

Physical properties were measured in the same manner as in Example 8 except that an ethylene/butene copolymer (ethylene content, 88 mol %; density, 885 kg/m$^3$; Mw, 155,000; Mw/Mn, 1.87) was used. The results are shown in Table 1.

TABLE 1

| Sample | Example 8 Branched olefin copolymer (PE-g-PMMA) | Comparative Example 1 Ethylene/butane copolymer |
| --- | --- | --- |
| TMA(° C.) | 106 | 80 |
| Shore hardness | 75 | 88 |
| Martens hardness (1/mm) | 17 | 9 |
| Repeated impulse (breakdown frequency) | 9 | 3 |
| Dielectric breakdown voltage (kV/mm) | 62 | 58 |

It is evident that the branched olefin copolymer obtained in Example 8 is superior to the non-branched olefin copolymer in heat resistance, flexibility, mar resistance, repeated impulse and dielectric breakdown voltage.

The invention claimed is:

1. A branched olefin copolymer comprising a building block (A) represented by formula (1) and a building block (B) represented by formula (2):

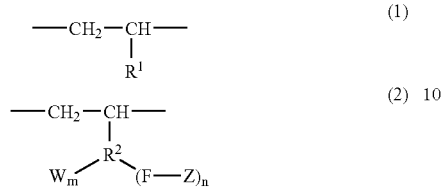

wherein the formula (1), $R^1$ represents a hydrogen atom or a $C_{1-18}$ linear or branched aliphatic hydrocarbon group; in the formula (2), $R_2$ represents a $C_{1-18}$ linear or branched aliphatic or aromatic hydrocarbon group; F represents a heteroatom or a heteroatom-containing linking group which contains at least one group selected from a carbonyl group and an aryl group; Z represents a polymer segment consisting of a monomer comprising a carbon-carbon double bond-containing moiety containing at least one member selected from the group consisting of an oxygen atom, a nitrogen atom, a halogen atom and an aryl group and having a molecular-weight distribution of 1.0 to 3.0; W represents a group selected from an alcoholic hydroxyl group, a phenolic hydroxyl group, a carboxylic acid group, a carboxylate group, an acid anhydride group, an amino group, an epoxy group, a siloxy group and a mercapto group; n is an integer of 1 to 3 and m is 0, 1 or 2 provided that when n is 2 or 3, Z may be the same or different to each other, and when m is 2, W may be the same or different to each other; and W may be bound to the same or different atom of $R^2$ to form a cyclic structure.

2. A process for producing the branched olefin copolymer described in claim 1, which comprises sequentially conducting the following steps 1, 2 and 3:

(step 1) a step of synthesizing a polar group-containing olefin copolymer (Q) containing at least one functional group (G) selected from a hydroxyl group, a carboxylic acid group, an ester group, an amino group, an epoxy group, a silanol group and an acid anhydride group, (step 2) a step of converting the functional group (G) into a group having an ability to initiate radical polymerization, and (step 3) a step of installing a polymer segment (Z) in the building block (B) represented by the formula (2) in the branched olefin copolymer by radical polymerization of a monomer essentially comprising a carbon-carbon double bond-containing compound (R) containing at least one selected from an oxygen atom, a nitrogen atom, a halogen atom and an aryl group.

3. A process for producing the branched olefin copolymer described in claim 1, which comprises sequentially conducting the following steps 1', 2' and 3':

(step 1') a step of synthesizing a polar group-containing olefin copolymer (Q) containing at least one functional group (G) selected from a hydroxyl group, a carboxylic acid group, an ester group, an amino group, an epoxy group, a silanol group and an acid anhydride group, (step 2') a step of converting the functional group (G) into a group having an ability to initiate anion polymerization, and (step 3') a step of installing a polymer segment (Z) in the building block (B) represented by the formula (2) in the branched polar group-containing olefin copolymer by anion polymerization (excluding ring-opening anion polymerization) of a monomer essentially comprising a carbon-carbon double bond-containing compound (R) containing at least one selected from an oxygen atom, a nitrogen atom, a halogen atom and an aryl group.

4. A process for producing the branched olefin copolymer described in claim 2 or claim 3, wherein the functional group (G) is a primary hydroxyl group or a maleic anhydride group.

5. A thermoplastic resin composition comprising the branched olefin copolymer described in claim 1.

6. A film, a sheet, an adhesive resin, a compatibilizing agent, a resin modifier, a lubricant oil modifier, a cement modifier, a building material/civil engineering material, an electrically insulating material for electrical and electronic parts, a magnetic recording medium, an automobile interior and exterior material, a gasoline tank, a filler dispersant or a dispersant, an aqueous emulsion, a coating base, a medical and hygienic material, and sundries, which comprise the branched olefin copolymer described in claim 1.

7. A film, a sheet, an adhesive resin, a compatibilizing agent, a resin modifier, a lubricant oil modifier, a cement modifier, a building material/civil engineering material, an electrically insulating material for electrical and electronic parts, a magnetic recording medium, an automobile interior and exterior material, a gasoline tank, a filler dispersant or a dispersant, an aqueous emulsion, a coating base, a medical and hygienic material, and sundries, which comprise the thermoplastic resin composition described in claim 5.

* * * * *